United States Patent
Melrose et al.

(10) Patent No.: US 7,123,433 B1
(45) Date of Patent: Oct. 17, 2006

(54) METHOD AND APPARATUS FOR RUNOUT CORRECTION DURING SELF-SERVO WRITING

(75) Inventors: Thomas O. Melrose, Longmont, CO (US); James W. Hargarten, Lafayette, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/642,512

(22) Filed: Aug. 14, 2003

Related U.S. Application Data

(60) Provisional application No. 60/403,583, filed on Aug. 14, 2002.

(51) Int. Cl.
*G11B 27/36* (2006.01)
*G11B 5/596* (2006.01)

(52) U.S. Cl. ............... 360/77.04; 360/31; 360/360; 360/77.08

(58) Field of Classification Search ............ 360/48, 360/75, 77.04
See application file for complete search history.

(56) References Cited

U.S. PATENT DOCUMENTS

| | | | |
|---|---|---|---|
| 6,091,564 A * | 7/2000 | Codilian et al. ............ 360/75 |
| 6,519,107 B1 * | 2/2003 | Ehrlich et al. ............. 360/75 |
| 6,549,362 B1 | 4/2003 | Melrose et al. ......... 360/77.04 |
| 6,751,046 B1 * | 6/2004 | Szita et al. ............ 360/77.04 |

* cited by examiner

*Primary Examiner*—Wayne Young
*Assistant Examiner*—Daniell L. Negrón
(74) *Attorney, Agent, or Firm*—Tejpal S. Hansra

(57) ABSTRACT

A disk drive self-servo writes on a storage disk. Servo bursts are self-written along a track using a transducer, a position error signal (PES) indicating repeatable runout due (RRO) for the servo bursts is determined using a reference pattern, an embedded runout correction (ERC) value is calculated based on the PES and stored in a corresponding servo sector, and then the disk drive self-writes other servo bursts.

99 Claims, 8 Drawing Sheets

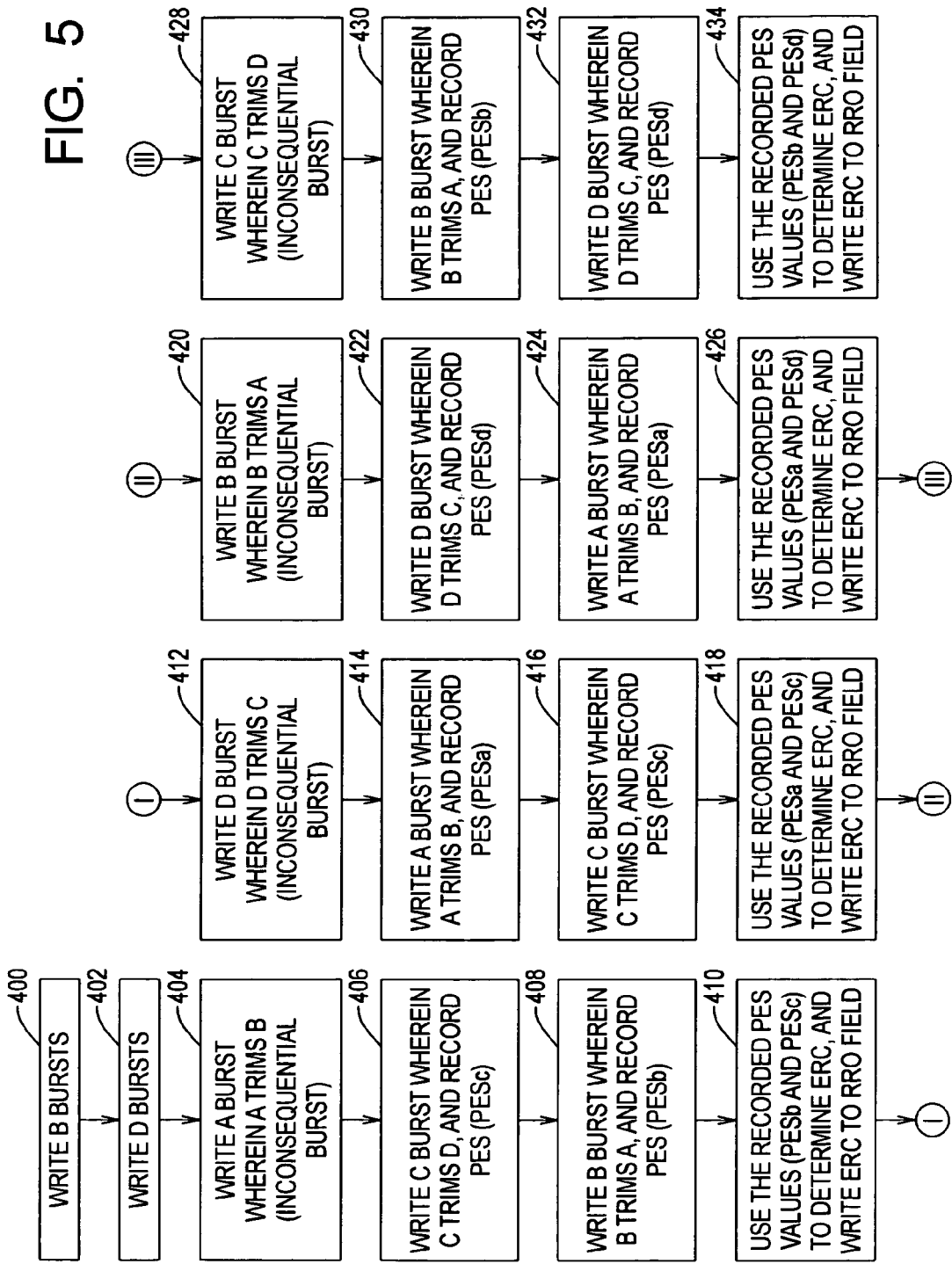

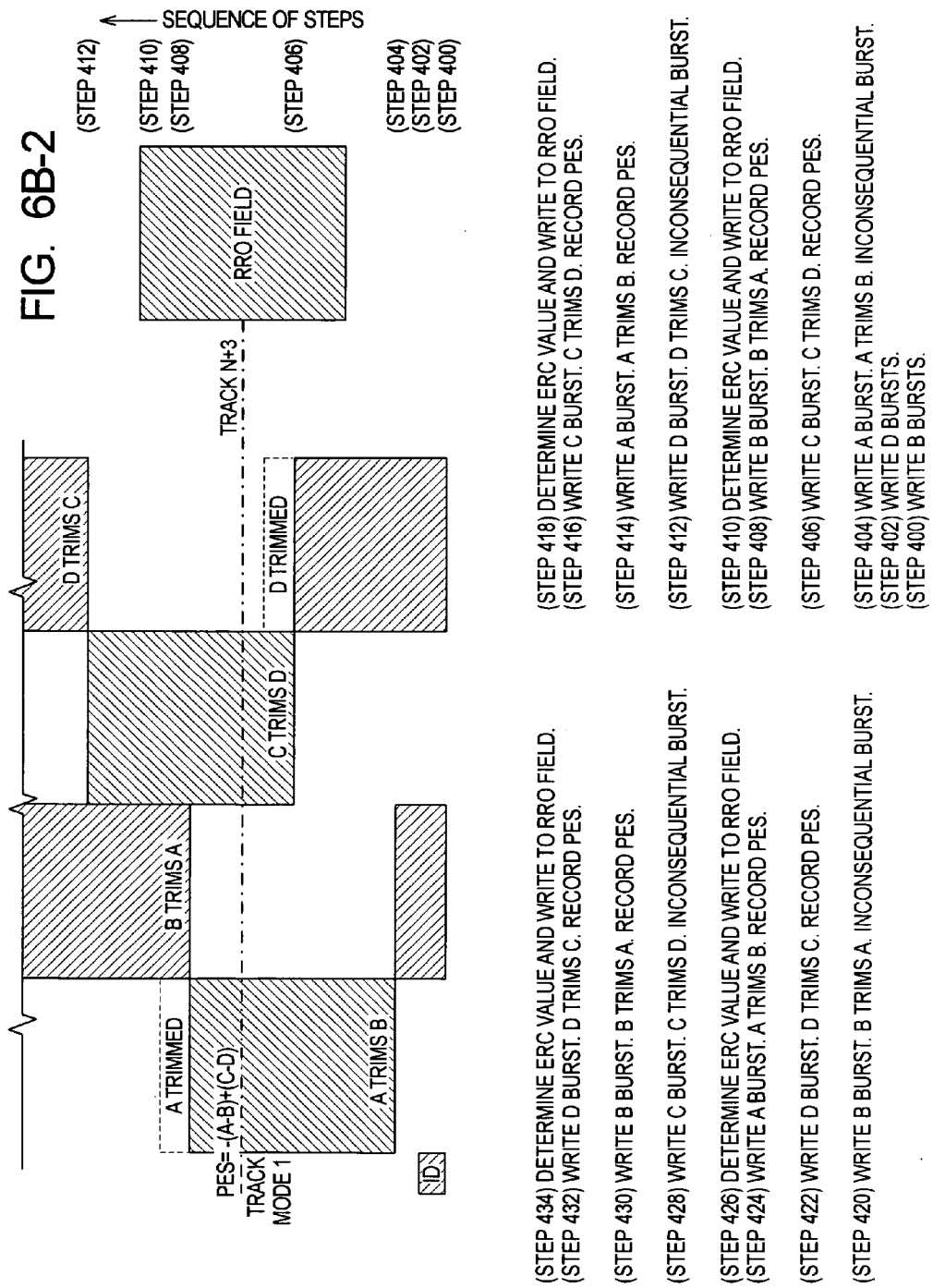

METHOD AND APPARATUS FOR RUNOUT CORRECTION DURING SELF-SERVO WRITING

RELATED APPLICATION

This application claims priority from U.S. Provisional Patent Application Ser. No. 60/403,583, filed on Aug. 14, 2002, entitled "On the Fly SSW ERC," which is incorporated herein by reference in its entirety.

FIELD OF THE INVENTION

The present invention relates to disk drives and, more particularly, to disk drive self-servo writing and runout correction.

BACKGROUND OF THE INVENTION

A disk drive is a data storage device that stores digital data in tracks on the surface of a data storage disk. Data is read from or written to a track using a transducer that is held close to the track while the disk spins about its center at a substantially constant angular velocity. To properly locate the transducer near the desired track during a read or write operation, a closed-loop servo control system reads a servo pattern from the disk surface to generate a position error signal (PES) and align the transducer with the desired track.

The servo pattern typically includes short servo bursts of a constant frequency signal. The servo bursts are written in a servo sector on the track, are very precisely located and are offset from either side of the track centerline. The servo bursts can be used to find the track centerline. Keeping the transducer on-center is required during both reading and writing to and from the track. The servo bursts allow the transducer to follow the track centerline around the disk even when the track is perturbed (out-of-round) due to spindle wobble, disk slip and/or thermal expansion.

Servo bursts are conventionally written on the disk in the disk drive by a dedicated, external servo track writer (STW). The STW typically uses a large granite block to support the disk drive and reduce outside vibration. Unfortunately, the STW is expensive and requires a clean room since the disk and the transducer are exposed to allow access by the STW.

Disk drives have been developed that use self-servo writing (SSW) for writing the servo pattern. SSW typically uses a temporary pre-existing servo reference pattern on the disk to position the transducer while the servo bursts are written to the disk. SSW involves three largely distinct steps: (1) reading the reference pattern to provide precise timing, (2) positioning the transducer at a sequence of radial positions using amplitude variations in a readback signal from the reference pattern as a sensitive position indicator, and (3) writing the servo bursts at the times and radial positions defined by the first two steps to form concentric circular tracks. SSW is described in U.S. Pat. No. 5,907,447 to Yarmchuk et al. SSW can also involve servo-propagation where the servo reader-to-writer offset allows servoing on written servo bursts while writing other servo bursts.

In an ideal disk drive, the tracks are non-perturbed circles situated about the center of the disk. These ideal tracks include a track centerline that is located at a known constant radius from the disk center. In an actual system, however, it is difficult to write non-perturbed circular tracks to the disk. Vibration, bearing defects, etc. can result in tracks that are written differently from the ideal non-perturbed circular track shape. Positioning errors created by the perturbed nature of these tracks are known as written-in repeatable runout (WRRO).

The perturbed shape of these tracks complicates the transducer positioning during read and write operations performed after SSW because the servo control system needs to continuously reposition the transducer during track following to keep up with the constantly changing radius of the track centerline with respect to the center of the spinning disk. Furthermore, the perturbed shape of these tracks can result in track squeeze and track misregistration errors during read and write operations.

Disk drives have been developed that measure the WRRO for each track, generate compensation values (also known as embedded runout correction values or ERC values) and write the ERC values to servo sectors in the tracks. Thereafter, during read/write operations, the ERC values are used to position the transducer along an ideal track centerline. This is described in U.S. Pat. No. 6,549,362 to Melrose et al. (the '362 patent), which is incorporated herein by reference.

Although the ERC values correct or reduce the WRRO, generating the ERC values can be time consuming. After SSW, the WRRO on each track is measured and then the ERC values are calculated. Finally, the ERC values are written to each servo sector of each track. This requires several revolutions of the disk to measure the WRRO on the track and then more revolutions of the disk to write the ERC values to the track. In one example, this may require 12 or more revolutions of the disk to determine and write the ERC values for each track.

There is, therefore, a need for a disk drive that performs SSW and reduces the time required to provide ERC values.

BRIEF SUMMARY OF THE INVENTION

The present invention addresses the above need. The present invention provides a disk drive that determines WRRO during SSW. ERC values are calculated and then written into corresponding servo sectors during SSW.

The disk drive can include a disk that includes a reference pattern which provides position information for self-writing servo bursts such that a PES is based on the reference pattern and the ERC values for the servo bursts are based on the PES.

The disk drive can also include a controller which implements the SSW of the present invention.

A method includes determining a first PES that indicates WRRO for first servo bursts using a transducer to read the reference pattern, self-writing the first servo bursts using the transducer, calculating an ERC value for the first servo bursts based on the first PES, storing the ERC value in a corresponding servo sector, and then self-writing other servo bursts.

The method can include determining a second PES that indicates WRRO for second servo bursts using the transducer to read the reference pattern, self-writing the second servo bursts using the transducer wherein the first and second servo bursts define a track centerline, and calculating the ERC value for the first and second servo bursts based on the first and second PES's.

In one embodiment, each servo sector includes a trimmed burst pattern, and self-writing the first servo bursts in each servo sector includes writing two first servo bursts such that one first servo burst trims the other first servo burst, thereby defining a first burst seam. In that case, the first PES indicates WRRO for the first burst seam. Further, self-writing the second servo bursts in each servo sector includes writing two second servo bursts such that one second servo burst trims the other second servo burst, thereby defining a second burst seam. In that case, the second PES indicates WRRO for the second burst seam. Each servo sector can include a trimmed burst pattern comprising four radially offset, circumferentially staggered servo bursts. Alternatively, each servo sector can include an untrimmed burst pattern.

In another embodiment, determining the first PES and self-writing the first servo bursts occurs during a first revolution of the disk, determining the second PES and self-writing the second servo bursts occurs during a second revolution of the disk, and writing the ERC value to the servo sector occurs during a third revolution of the disk.

Other objects, features, embodiments and advantages of the invention will be apparent from the following specification taken in conjunction with the following drawings.

BRIEF DESCRIPTION OF THE DRAWINGS

FIG. 5 is a flowchart of SSW according to the present invention;

FIGS. 6A-1 and 6A-2 together form a diagrammatic representation of a servo burst pattern written according to the SSW in FIG. 5; and FIGS. 6B-1 and 6B-2 together form another diagrammatic representation of a servo burst pattern written according to the SSW in FIG. 5.

DETAILED DESCRIPTION OF THE INVENTION

Figure 1:
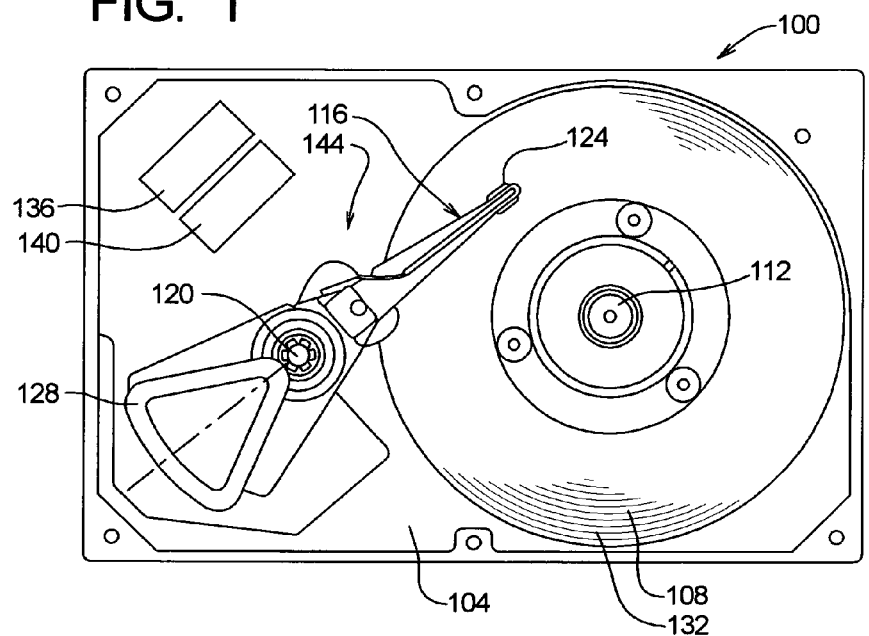
FIG. 1 is a diagrammatic representation of a top view of a hard disk drive with the top cover removed.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Further, although in the description below, example embodiments of the present invention are described in connection with a disk drive, it should be noted that the present invention is not intended to be limited to such systems.

FIG. 1 illustrates a typical computer disk drive. The disk drive 100 includes a base 104 and a magnetic disk (or disks) 108 (only one of which is shown in FIG. 1). The disk 108 is interconnected to the base 104 by a spindle motor (not shown) mounted within or beneath the hub 112 such that the disk 108 can be rotated relative to the base 104. Actuator arm assembly (or assemblies) 116 (only one of which is shown in FIG. 1) is interconnected to the base 104 by a bearing 120. The actuator arm assembly 116 includes a transducer (or head) 124 (which includes both a read element and a write element) at an end to transfer data to and from a surface of the disk 108. A voice coil motor (VCM) 128 pivots the actuator arm assembly 116 about the bearing 120 to radially position the transducer 124 with respect to the disk 108. By changing the radial position of the transducer 124 with respect to the disk 108, the transducer 124 can access different tracks 132 on the disk 108. The VCM 128 is operated by a controller 136 that is in turn operatively connected to a host computer (not shown). A channel 140 processes information read from the disk 108 by the transducer 124.

Figure 2:
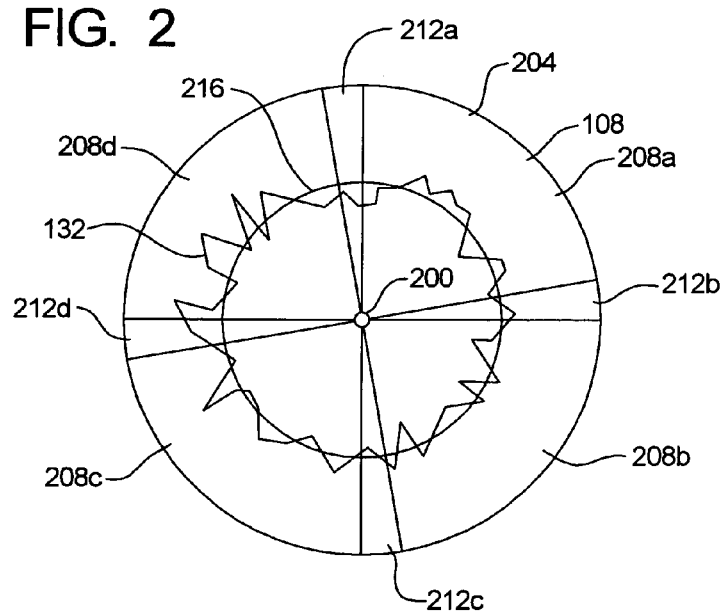
FIG. 2 is a diagrammatic representation of a magnetic storage disk having a data track that is compensated for runout in accordance with the present invention.

As illustrated in FIG. 2, the disk 108 is substantially circular in shape and includes a center point 200. The disk 108 also includes tracks 132 (only one of which is illustrated in FIG. 2) on an upper surface 204 of the disk 108 for storing digital data. The tracks 132 are divided into data fields 208a–208d and servo sectors (or hard sectors) 212a–212d. Generally, the data fields 208a–208d are used for storing user data as a series of magnetic transitions, while the servo sectors 212a–212d are used for storing servo information, also as a series of magnetic transitions/bursts, that provide the transducer 124 with positioning information. In particular, the servo sectors 212a–212d provide the transducer 124 with information concerning its position over the disk 108. More particularly, the servo sectors 212a–212d provide information to the transducer 124 concerning the identity of the track 132 and the servo sector 212 over which the transducer 124 is flying, and concerning the position of the transducer 124 with respect to the centerline of the track 132.

Although the disk 108 illustrated in FIG. 2 has a relatively small number of data tracks 132 and servo sectors 212, it can be appreciated that a typical disk drive contains a very large number of data tracks 132 and servo sectors 212. For example, disk drives having over 100,000 tracks per inch and 240 servo sectors per track are presently available.

The disk drive 100 includes a servo control system 144 for controlling the position of the transducer 124 with respect to the track 132 being followed. In general, the servo control system 144 comprises the transducer 124 being positioned, which reads the position information from the servo sectors 212, the actuator arm assembly 116 that is carrying the transducer 124, the VCM 128, the controller 136 and the channel 140. As described in the '362 patent, the response of the servo control system 144 to a given input is given by the error transfer function of the servo control system 144.

The track 132 is ideally non-perturbed and ideally shares a common center 200 with the disk 108, such as the ideal track 216 illustrated in FIG. 2. Due to system imperfections, however, the actual written track 132 can be perturbed, such as the non-ideal track 132 illustrated in FIG. 2, as compared to the ideal track 216. A perturbed or non-ideal track 132 is difficult for the transducer 124 to follow because the position of the transducer 124 must constantly be adjusted by the servo control system 144. Perturbations from the ideal track center negatively impact track-to-track spacing. Consequently, track-to-track spacing must be increased to compensate for this position error, leading to lower disk capacity. Further, positioning of the transducer 124 is not as accurate on the perturbed track 132 as it would be on the ideal track 216.

The perturbations in the track 132 due to positioning errors can be effectively reduced by SSW according to the present invention. The present invention provides a method and system that allows self-servo writing servo information (e.g., servo bursts) in the tracks 132 along with correction information (e.g., ERC values) that compensate for position errors (e.g., WRRO). After SSW, during the disk drive 100 operation, the transducer 124 servoing on the track 132 can more closely follow the path of the ideal track 216 using the correction information.

The tracks 132 are each divided into interleaving data fields 208 and servo sectors 212. The servo sectors 212 are located in servo wedges that radially extend across the tracks 132. The servo sectors 212 include, among other things, information for use by the disk drive 100 in locating the transducer 124 above a desired track 132. When a host computer requests that data be read from or written to a particular data field 208 in a particular track 132, the transducer 124 must be moved to the track 132 and then must be positioned at a predetermined location relative to the centerline of the track 132 before the data transfer can take place. For purposes of illustrating the present invention, it will be assumed that the transducer 124 should be placed on the track centerline in order to read from and write to the disk 108. It should be understood that the invention is not limited to solely reading and writing when the transducer 124 is placed at the track centerline. The track 132 is written to the disk 108 during SSW according to the present invention such that WRRO is effectively reduced.

Figure 3:
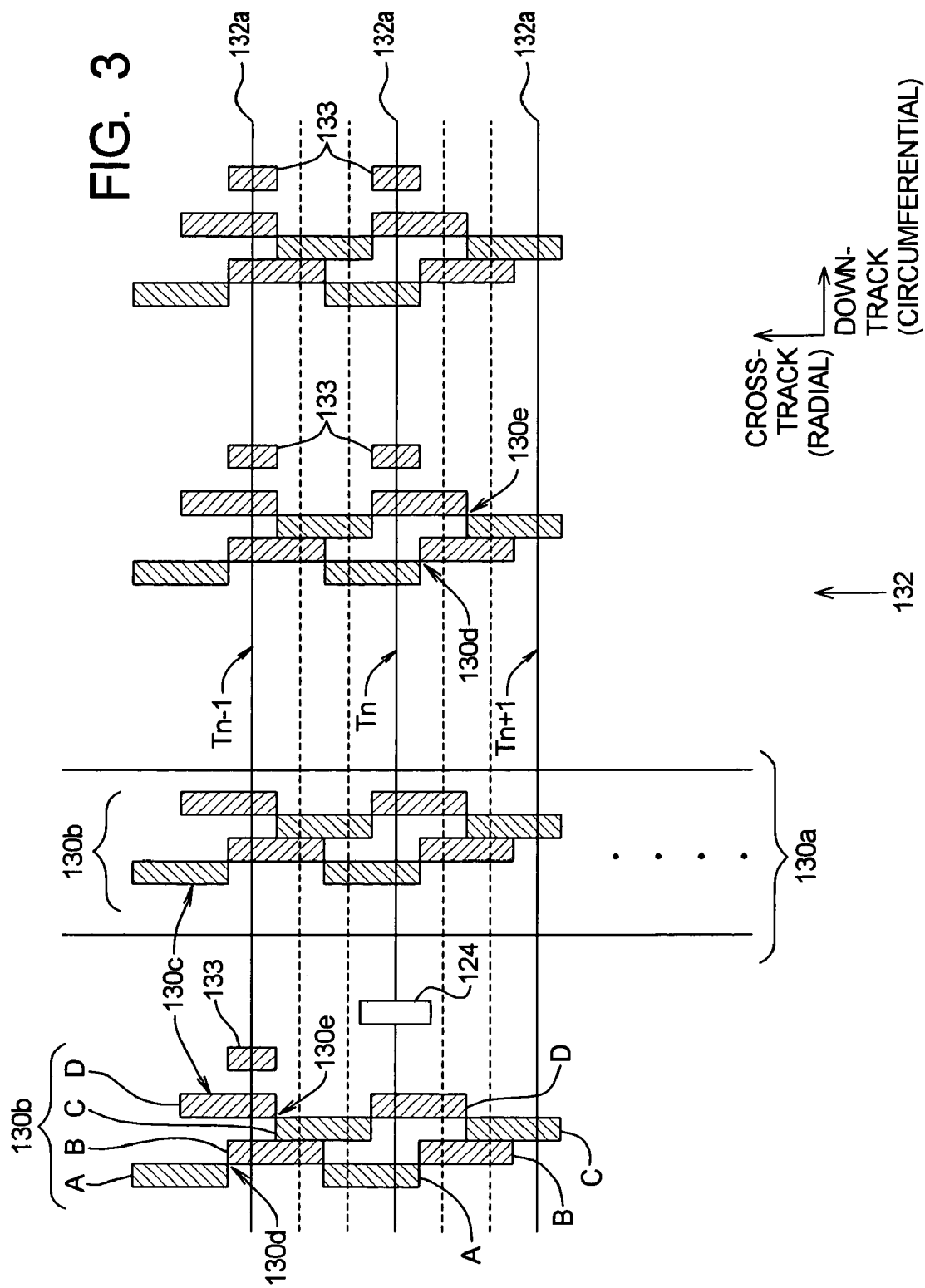
FIG. 3 is a diagrammatic representation of a servo burst pattern that may be used to position a transducer with respect to a track centerline.

FIG. 3 illustrates typical servo pattern 130b stored within a servo wedge 130a. The servo pattern 130b is used for centering the transducer 124 on a desired track 132. In FIG. 3, the tracks 132 are diagrammatically laid out linearly in a down-track (circumferential) direction from left to right, and in a cross-track (radial) direction from top to bottom. Three tracks 132 designated as tracks Tn−1, Tn and Tn+1 are shown. The servo pattern 130b includes radially offset, circumferentially staggered, final servo bursts 130c designated as A, B, C and D bursts. The servo bursts 130c define the centerlines 132a of the tracks 132. Thus, three centerlines 132a of three tracks 132 are defined by the servo bursts 130c. The servo bursts 130c provide analog information to the servo control system 144 for positioning the transducer 124. Other numbers of servo bursts and offset configurations are also possible. In this example, the A, B bursts form a burst pair and the C, D bursts form another burst pair. During normal operation of the disk drive 100, the A, B, C and D bursts are used by the servo control system 144 to position the transducer 124 at a track centerline.

SSW a track 132 that is later sampled by the servo control system 144 in positioning the transducer 124 to follow a track 132 which more closely resembles the ideal track 216 is now described. A temporary reference pattern of servo information (not shown) is initially provided on the disk 108 and used by the servo control system 144 to determine a PES for positioning the transducer 124 to write the servo bursts 130c. In a preferred implementation, an iterative process such as described in the '362 patent is applied to the reference pattern to reduce the RRO written into the reference pattern. The reference pattern with reduced RRO is then used for writing the servo bursts 130c.

The SSW described herein generates trimmed servo bursts. A trimmed servo burst has a circumferential edge (a top or bottom edge that extends in the circumferential direction) that is DC erased during a subsequent pass of the write element of the transducer 124 at a displaced radial position relative to the disk 108. The burst is trimmed to have e.g. a bottom edge in radial alignment with a top edge of an adjacent burst. It is possible to trim a previously written burst during a single pass of the transducer 124 write element along a servo-writing path for writing another burst. However, the present invention is useful with untrimmed, and other trimmed, servo bursts. A discussion of trimmed and untrimmed bursts is provided in U.S. Pat. No. 6,519,107 to Ehrlich et al., which is incorporated herein by reference.

The SSW includes reading the reference pattern using the transducer 124 to generate a PES, calculating an ERC value based on the PES, self-writing the servo bursts 130c along a track 132 using the transducer 124, and writing the ERC value to the corresponding RRO field 133 on the track 132 using the transducer 124. As such, the centerline of a mispositioned track 132 is effectively moved (repositioned) to a corrected track centerline location. After the SSW is completed, during operation of the disk drive 100, initially upon seeking to a track 132 and reading a first set of the servo bursts 130c, the servo control system 144 follows the original (uncorrected) track centerline until it reads the ERC value from the corresponding RRO field 133, and thereafter moves the transducer 124 to the corrected track centerline location. Thereafter, the servo bursts 130c and the ERC values in the corresponding RRO fields 133 are used by the servo control system 144 to continue following the corrected (effectively re-positioned) track centerline.

In one example, in self-writing a track 132, the transducer 124 is positioned to write the A bursts along a circular path during a revolution of the disk 108. Then, in another revolution of the disk 108 the transducer is moved to write the C bursts. Then, in another revolution of the disk 108 the transducer 124 is moved to write the B bursts, and the B bursts trim off the bottom edges of the A bursts, thereby defining first burst seams (transitions) 130d between the A bursts and the B bursts. In addition, the position errors in the burst seams 130d are measured by the transducer 124 reading the reference pattern and are stored in memory during the revolution of the disk 108. Then, in another revolution of the disk 108, the transducer 124 is moved to write the D bursts, and the D bursts trim off the bottom edges of the C bursts, thereby defining a second burst seam (transition) 130e between the C, D bursts. In addition, the position errors in the burst seams 130e are measured by the transducer 124 reading the reference pattern and are stored in memory during the revolution of the disk 108. Then, the position errors for the A, B bursts and the C, D bursts are used to generate ERC values that are written by the transducer 124 to the RRO fields 133 corresponding to the A, B, C and D bursts of the track 132 during another revolution of the disk 108.

Other sequences for writing and trimming the servo bursts 130c are possible. The motion of the transducer 124 defines where the burst seams 130d, 130e occur. Since the transducer 124 has motion due to non-repeatable runout (NRRO), the difference between the intended position of the burst seams 130d, 130e and the actual position of the burst seams 130d, 130e due to such movement of the transducer 124 is a capture of the NRRO and is recorded in the servo bursts 130c by mispositioning the burst seams 130d, 130e as WRRO. To compensate for the WRRO in the burst seams 130d, 130e, the ERC values are determined and written to the RRO fields 133. For example, if the burst seam 130e is located too far towards the outer diameter (OD) of the disk 108 (offset from ideal) by a given amount, then the ERC values are calculated and written into the corresponding RRO fields 133 during SSW, and after SSW, during operation of the disk drive 100, the servo control system 144 uses the burst seams 130d, 130e and the ERC values in the corresponding RRO fields 133 to position the transducer 124 towards the inner diameter (ID) of the disk 108 by the given amount. As such, the servo control system 144 effectively follows a track centerline at the intended (ideal/circular) track position.

Specifically, after the servo bursts 130c are written by SSW, in normal disk drive 100 operation, the servo control system 144 senses the position of the burst seams 130d between the A, B bursts and the burst seams 130e between the C, D bursts for track following. At each read/write position, one burst seam 130d and one burst seam 130e is used. The servo control system 144 averages the observed position of the burst seams 130d, 130e and combines that average with the ERC value in the corresponding RRO field 133 to generate the PES to control the VCM 128 for properly positioning the transducer 124 over the track 132. Therefore, if during SSW, one or both of the burst seams 130d, 130e are mispositioned slightly towards the ID or the OD of the disk 108, and thus slightly mispositioned slightly away from the intended (ideal) position, then the ERC value in the PES compensates for that mispositioning and the transducer 124 follows the path of an ideal track 216 using the PES generated in each of the servo sectors 212 of the particular track 132.

The reference pattern is provided on the disk 108 before the SSW begins. An iterative process such as described in the '362 patent is applied to the reference pattern to reduce the RRO that is written into the reference pattern. The reference pattern with reduced RRO is then used for writing the servo bursts 130c and calculating the ERC values.

Figure 4:
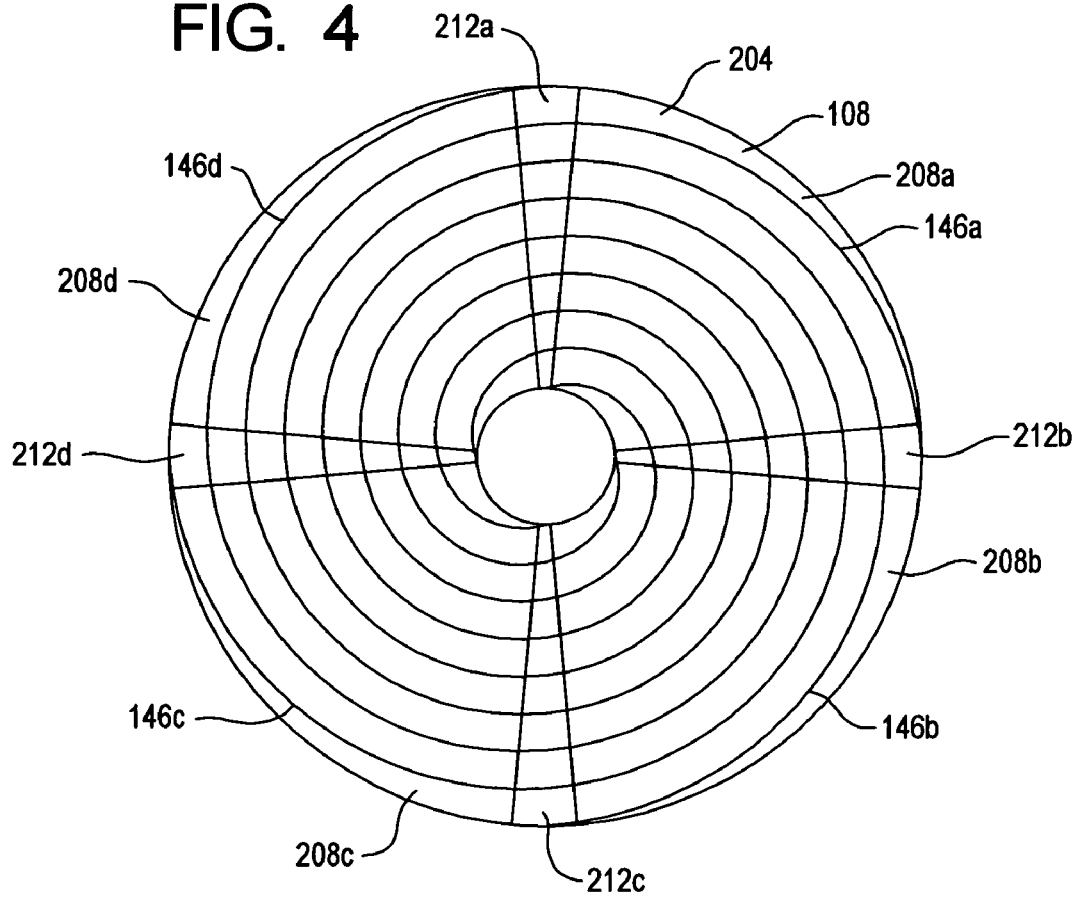
FIG. 4 is a diagrammatic representation of the magnetic storage disk in FIG. 2 having a reference pattern that includes circumferentially spaced spirals.

In one example, as illustrated in FIG. 4, the reference pattern includes a set of circumferentially spaced spirals 146 shown as spirals 146a–146d. The spirals 146 start at the OD of the disk 108 and end at the ID of the disk 108. The spirals 146 have information written along their length that provides radial positions for track following during SSW the servo bursts 130c on the tracks 132. Although the disk 108 illustrated in FIG. 4 has a relatively small number of spirals 146, it can be appreciated that the disk 108 contains a very large number of spirals 146.

The WRRO in the burst seams 130d, 130e is related to the PES at the time the burst seams 130d, 130e are written (created), and the PES is determined using the reference pattern.

In one case, each servo burst 130c is written a short time after the transducer 124 passes over a spiral 146. Because the NRRO is at a lower frequency than the spiral sample rate, the transducer 124 cannot move too far off a track 132 after each spiral 146. As such, the PES generated at the time the transducer 124 passes over and reads the last spiral 146 before the servo burst 130c is written is a good estimate of the position error when the servo burst 130c is subsequently written. That is, the PES generated by reading the spiral 146 indicates the PES for the servo burst 130c. As a result, the PES for the servo burst 130c is generated by reading the spiral 146 immediately before writing the servo burst 130c, and without reading the servo burst 130c, thereby avoiding additional revolutions of the disk 108 that would otherwise be needed to read the servo burst 130c to generate the PES, and in turn reducing the overall manufacturing time. It is preferable to record (store in memory) the PES from the transducer 124 reading the spiral 146 at the time the transducer 124 crosses the spiral 146, immediately before writing the servo burst 130c in a servo sector 212. In this example, where four servo bursts are used, the PES's for the servo bursts 130c written in the servo sectors 212 around a track 132 are used to back-calculate the ERC values to be written in the RRO fields 133 on the track 132. In one version, the ERC values are written to the corresponding RRO fields 133 around the track 132 in a revolution of the disk 108 after the servo bursts 130c are written.

If the spiral 146 has been corrected for RRO, such as by the process described in the '362 patent, then the PES from the spiral 146 is equal to the misposition of the transducer 124 from the ideal track centerline (the frequency content of the NRRO is significantly lower than the servo sample rate). This PES from the spiral 146 is a good indication of the misposition of the transducer 124 as the servo burst 130c is written. It is also possible to measure the PES on the spirals 146 on both sides of the servo burst 130c and to interpolate a more accurate misposition of the servo burst 130c. That is, the ERC value can be calculated using an interpolated PES based on PES's measured from spirals 146 on both sides of the servo burst 130c. After the PES from the spiral 146 is generated such that the induced error due to servo burst mispositioning is determined, the ERC value is calculated. Once the ERC value has been calculated, the ERC value can be written to the RRO field 133. In this example, where multiple servo bursts 130c are used, it will be necessary to reposition the transducer 124 to the track centerline before writing the ERC values in the RRO fields 133 of the track 132.

An example SSW is now described. A process such as described in the '362 patent is applied to the reference pattern (e.g., spiral tracks) that is used for servoing the transducer 124 as the transducer 124 writes the servo bursts 130c. This reduces, and can virtually eliminate, the RRO written into the reference pattern. The reference pattern with reduced RRO is then used for writing the servo bursts 130c and calculating the ERC values. However, in writing the servo bursts 130c that define the burst seams 130d, 130e the NRRO is recorded as WRRO in mispositioned burst seams 130d and/or 130e that perturb the track 132. The PES from the reference pattern immediately before writing the burst seams 130d, 130e indicates how far the burst seams 130d, 130e are mispositioned from their ideal/intended position. The PES is obtained from the reference pattern immediately before one servo burst 130c trims another servo burst 130c and is stored in memory.

The PES from the reference pattern immediately before performing a burst write/trim operation that controls a position of a burst seam 130d, 130e indicates how far the burst seam 130d, 130e is mispositioned. That is, the mispositioning error (WRRO) is the stimulus and the PES is the response. The mispositioning error can be calculated from the PES as described in the '362 patent.

The ERC values are calculated based on the PES from the reference pattern to compensate for mispositioning the burst seams 130d, 130e. The ERC values are written to the RRO fields 133 during SSW, and after SSW is completed, during the disk drive 100 operation, the ERC values are read from the RRO fields 133 and combined with the corresponding servo bursts 130c position information to generate a PES for the VCM 128 to position the transducer 124 to compensate for mispositioning the burst seams 130d, 130e, thereby reducing the overall track runout.

In general, the PES is derived by reading the reference pattern immediately before the burst seams 130d, 130e are written for a track 132. Obtaining the PES from a reference pattern is known by those skilled in the art, and need not be described herein. Preferably, the position error data is obtained from the reference pattern, and the RRO written in the reference pattern is reduced by known methods.

FIG. 5 is a flowchart of SSW according to the present invention.

Figures 1, 6A:
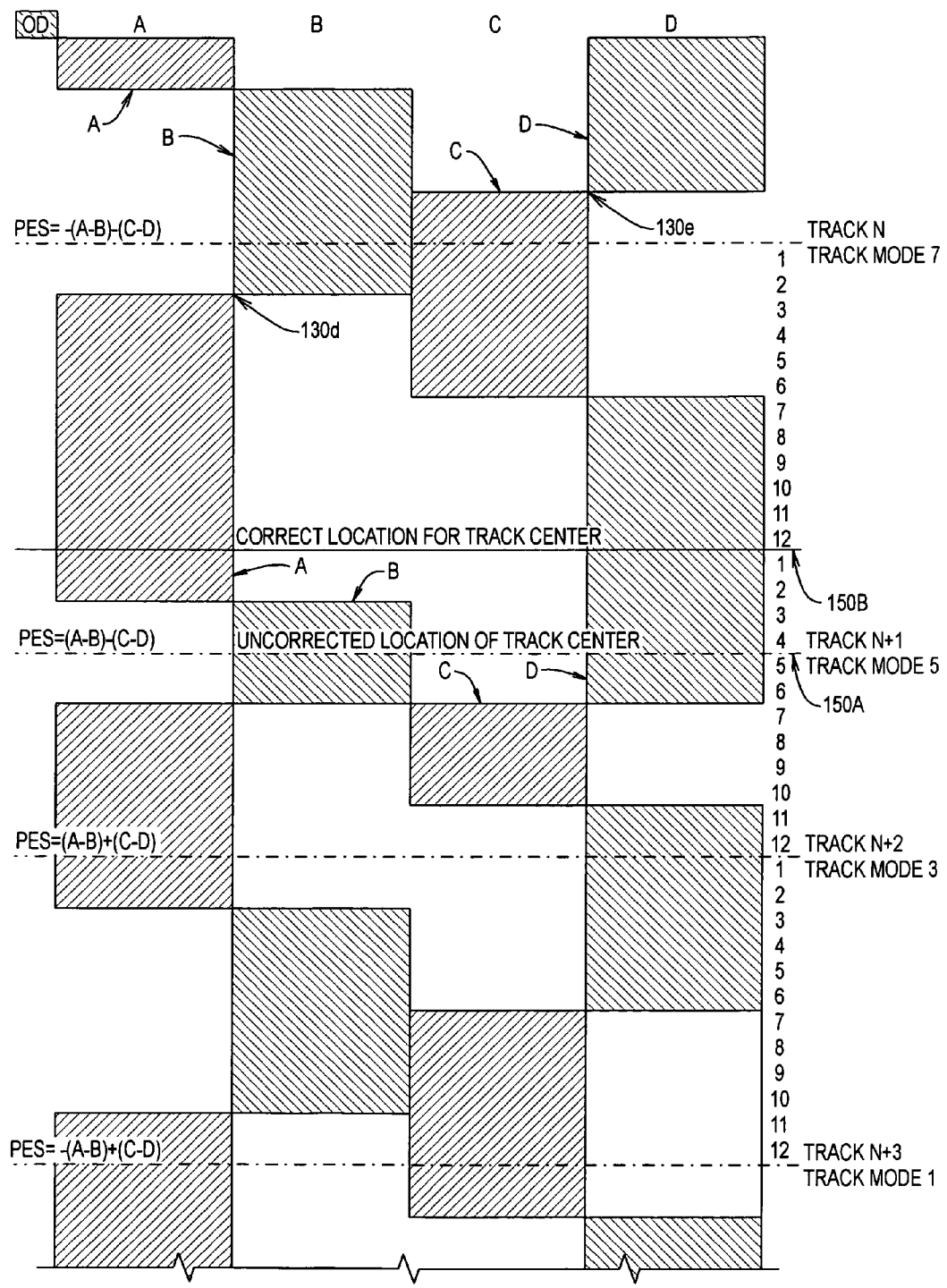
Figures 2, 6A:
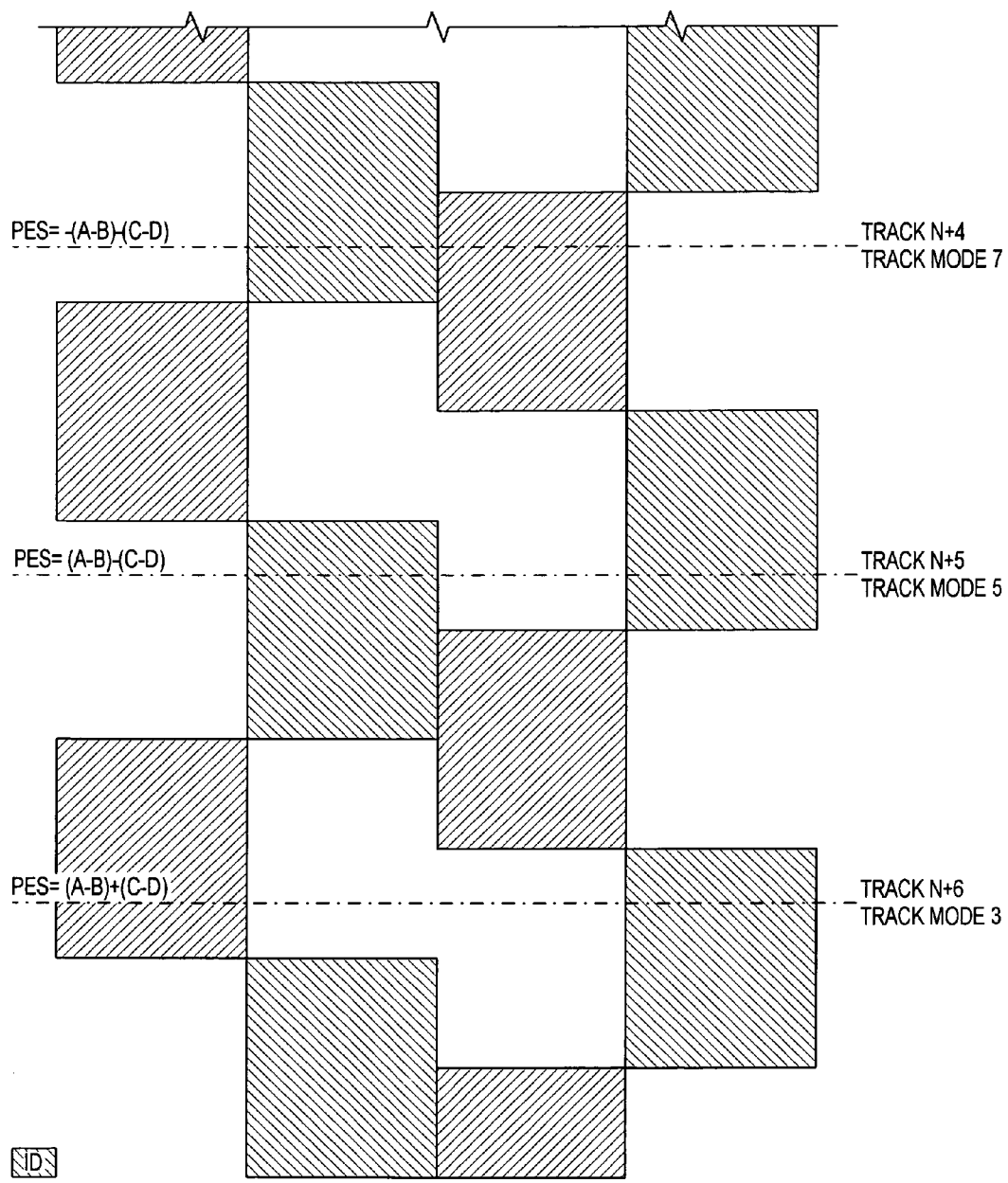

FIGS. 6A-1 and 6A-2 together show a diagrammatic representation of a servo burst pattern written according to the SSW in FIG. 5. Seven tracks 132 designated as tracks N, N+1, N+2, N+3, N+4, N+5 and N+6 are shown. The track centerlines are defined by the A, B, C and D bursts in each servo wedge. Track N+1 has SSW positioning error, and the track centerline is at an incorrect location 150A rather than the correct location 150B. That is, the burst seams 130d, 130e in track N+1 cause the centerline of track N+1 to be offset from its intended location. According to the present invention, the centerline for track N+1 is effectively moved to the correct location 150B based on an ERC value in a corresponding RRO field 133.

Figures 1, 6B:
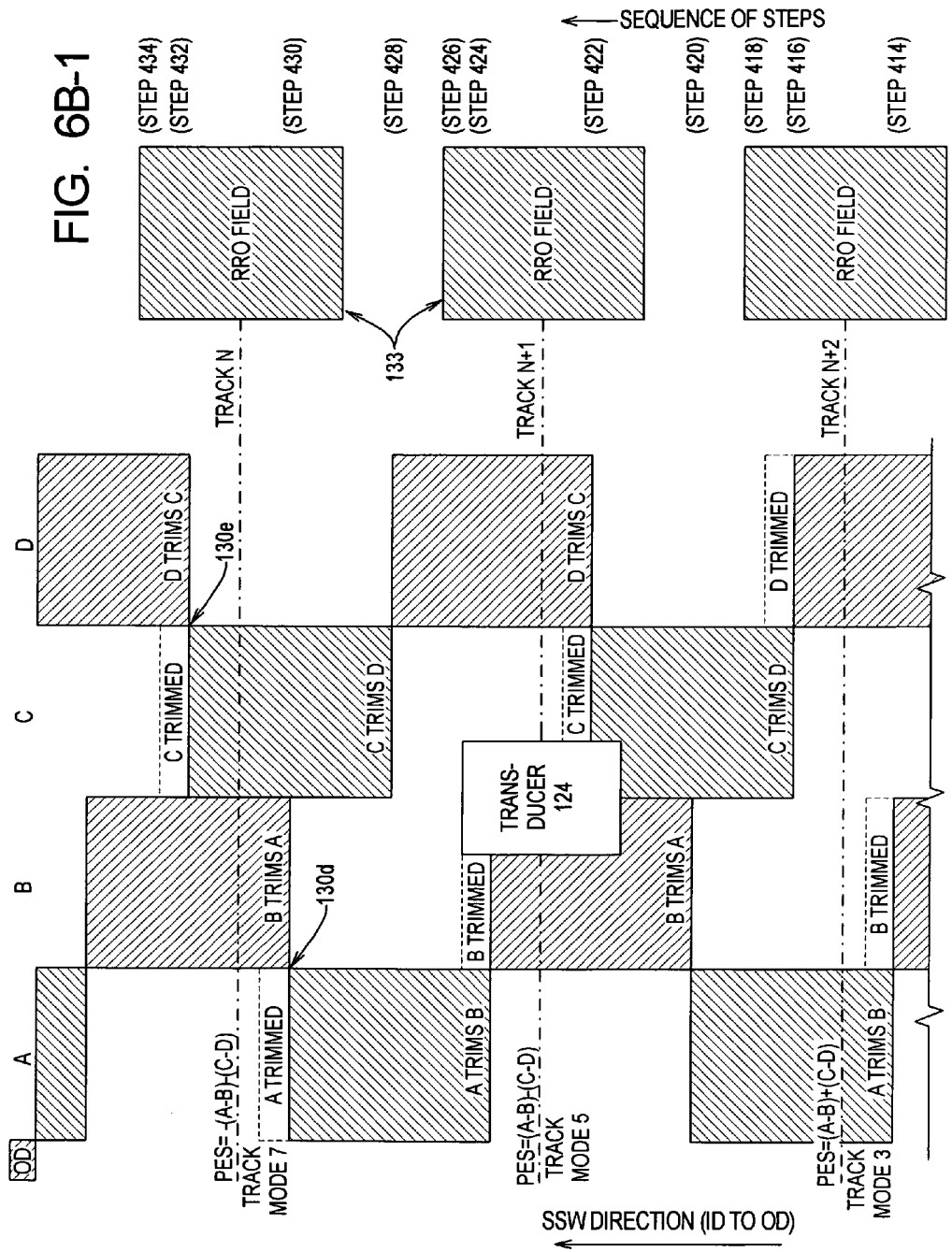

FIGS. 6B-1 and 6B-2 together show a diagrammatic representation of another servo burst pattern written according to the SSW in FIG. 5. Four tracks 132 designated as tracks N, N+1, N+2 and N+3 are shown. The track centerlines are defined by the A, B, C and D bursts in each servo wedge. Further, the four tracks have corrected centerlines. The inconsequential bursts serve to isolate adjacent tracks and prevent any correction accumulation.

The A, B, C and D bursts correspond to four track modes. In particular, tracks N, N+1, N+2, N+3, N+4, N+5 and N+6 have track modes 7, 5, 3, 1, 7, 5 and 3, respectively. Each track mode indicates the sequence in which the bursts are written/trimmed, and the corresponding PES from the bursts during normal operation of the disk drive 100 is based on combinations of the burst difference values corresponding to the track mode. For example, track mode 1 corresponds to the burst combination PES=−(A−B)+(C−D), track mode 3 corresponds to the burst combination PES=−(A−B)+(C−D), track mode 5 corresponds to the burst combination PES=(A−B)−(C−D), and track mode 7 corresponds to the burst combination PES=−(A−B)−(C−D). Other track modes 0, 2, 4 and 6 are used for two burst tracks (i.e., A, B bursts or C, D bursts).

In writing the servo bursts for track N using track mode 7, the A bursts are written in a revolution of the disk 108. Then, in another revolution of the disk 108 the C bursts for track N are written. Then, in another revolution of the disk 108 the B bursts are written and each B burst trims the bottom edge of a corresponding A burst. The trimmed portion of the A burst, which includes the bottom edge of the A burst, is represented as a dashed box designated as "A trimmed." During the revolution of the disk 108 in which each A burst is trimmed, the PES that indicates the position of the A, B burst seam 130d is read from the reference pattern and stored in memory. Then, in another revolution of the disk 108 the D bursts are written and each D burst trims a corresponding C burst. The trimmed portion of the C burst, which includes the bottom edge of the C burst, is represented as a dashed box designated as "C trimmed." During the revolution of the disk 108 in which each C burst is trimmed, the PES that indicates the position of the C, D burst seam 130e is read from the reference pattern and stored in memory. The recorded PES's are then used to determine ERC values that are written into the RRO fields 133.

Referring back to FIG. 5, the SSW involves writing/trimming the servo bursts from bottom to top, in sequence, in FIGS. 6B-1 and 6B-2. Writing the four burst servo pattern is performed in eight steps which represent the four track modes. The process starts at a track mode (e.g., track mode 1) and cycles through the track modes depending on the steps.

The steps in FIG. 5 are also shown FIGS. 6B-1 and 6B-2, from bottom to top, in sequence. Each step is aligned with the respective burst writing/trimming operation, with further explanation provided at the bottom of FIGS. 6B-2. Referring to FIG. 5 in conjunction with the FIGS. 6B-1 and 6B-2, starting from track N+3 at the bottom of FIGS. 6B-2 and moving from the bottom of FIGS. 6B-2 to the top of FIGS. 6B-2, from the top of FIGS. 6B-2 to the bottom of FIGS. 6B-1, and from the bottom of FIGS. 6B-1 to the top of FIGS. 6B-1, the sequential steps for writing the servo bursts for the four tracks N, N+1, N+2 and N+3 are as follows:

1) The B bursts are written in a disk 108 revolution (step 400);

2) The D bursts are written in another disk 108 revolution (step 402);

3) The A bursts are written in another disk 108 revolution and each A burst trims a corresponding B burst (inconsequential burst) (step 404);

4) The C bursts are written in another disk 108 revolution, each C burst trims a corresponding D burst (creating C, D burst seams 130e) and the PES (PESc) from the reference pattern for each C burst (and C, D burst seam) is recorded (e.g., stored in memory in the controller 136) (step 406);

5) The B bursts are written in another disk 108 revolution, each B burst trims a corresponding A burst (creating A, B burst seams 130d) and the PES (PESb) from the reference pattern for each B burst (and A, B burst seam) is recorded (step 408);

6) The just stored PES's (PESb and PESc) are used to determine an ERC value and the ERC value is written to the corresponding RRO field (step 410);

7) The D bursts are written in another disk 108 revolution and each D burst trims a corresponding C burst (inconsequential burst) (step 412);

8) The A bursts are written in another disk 108 revolution, each A burst trims a corresponding B burst (creating A, B burst seams 130d) and the PES (PESa) from the reference pattern for each A burst (and A, B burst seam) is recorded (step 414);

9) The C bursts are written in another disk 108 revolution, each C burst trims a corresponding D burst (creating C, D burst seams 130e) and the PES (PESc) from the reference pattern for each C burst (and C, D burst seam) is recorded (step 416);

10) The just stored PES's (PESa and PESC) are used to determine an ERC value and the ERC value is written to the corresponding RRO field (step 418);

11) The B bursts are written in another disk 108 revolution and each B burst trims a corresponding A burst (inconsequential burst) (step 420);

12) The D bursts are written in another disk 108 revolution, each D burst trims a corresponding C burst (creating C, D burst seams 130e) and the PES (PESd) from the reference pattern for each D burst (and C, D burst seam) is recorded (step 422);

13) The A bursts are written in another disk 108 revolution, each A burst trims a corresponding B burst (creating A, B burst seams 130d) and the PES (PESa) from the reference pattern for each A burst (and A, B burst seam) is recorded (step 424);

14) The just stored PES's (PESa and PESd) are used to determine an ERC value and the ERC value is written to the corresponding RRO field (step 426);

15) The C bursts are written in another disk 108 revolution and each C burst trims a corresponding D burst (inconsequential burst) (step 428);

16) The B bursts are written in another disk 108 revolution, each B burst trims a corresponding A burst (creating A, B burst seams 130d) and the PES (PESb) from the reference pattern for each B burst (and A, B burst seam) is recorded (step 430);

17) The D bursts are written in another disk 108 revolution, each D burst trims a corresponding C burst (creating C, D burst seams 130e) and the PES (PESd) from the reference pattern for each D burst (and C, D burst seam) is recorded (step 432);

18) The just stored PES's (PESb and PESd) are used to determine an ERC value and the ERC value is written to the corresponding RRO field (step 434); and so on.

The calculation of the ERC values is dependent on the servo write technique being used. For example, if in the example of FIGS. 5, 6A-1, 6A-2, 6B-1 and 6B-2 a one-pass trimmed process writes the servo bursts, the ERC calculation is track mode dependent according to Table 1 below, where x is a positive integer:

TABLE 1

| Track Mode | Track Number | Servo Track Number | PES | ERC |
|---|---|---|---|---|
| 5 | 4x + 0 | 3x + 0 | (A–B) – (C–D) | –(PESa + PESd)/2 |
| 3 | 4x + 1 | 3x + 1 | (A–B) + (C–D) | –(PESa + PESc)/2 |
| 1 | 4x + 2 | 3x + 2 | –(A–B) + (C–D) | –(PESb + PESc)/2 |
| 7 | 4x + 3 | 3x + 2 | –(A–B) – (C–D) | –(PESb + PESd)/2 |

In another example, if a one-pass untrimmed process is used to write the servo bursts, the ERC calculation is ERC=–(PESa+PESb+PESc+PESd)/4, independent of the track mode. As those skilled in the art will recognize, similar calculations can be used for processes with multiple writes and independent trims.

As those skilled in the art will appreciate, the transducer 124 is moved under PES and timing control to write the various servo bursts 130c at different radial positions on the disk 108. Further, the transducer 124 is moved to write the RRO fields 133. In one implementation, the transducer 124 is controlled to back-up one and a half servo steps to write the RRO field 133 that corresponds to the track centerline. In another implementation, if backing-up to write the RRO fields 133 interrupts the SSW then the RRO fields 133 are written to a convenient track location as soon as the ERC values are calculated without backing-up the transducer 124, and in a later step (e.g., a test process) the RRO fields 133 are "moved" by reading the ERC values therein and re-writing the ERC values at the desired track location. In accordance with another aspect of the present invention, if the micro-jog (reader-to-writer offset) profile for the transducer 124 is determined, then the RRO correction for the read position can also be calculated.

The present invention is applicable to other servo burst patterns and other burst numbers (e.g., a six burst system) by taking into account the servo burst relationships and how the servo bursts trim one another. The present invention is also applicable to independent trim passes (e.g., the burst trim passes are separate from the burst write passes). The present invention is also applicable to servo writing that uses multiple writes, where e.g. the A burst is written and trimmed twice and the average of the A, B bursts is used. The mispositioning of each servo burst is the sum of the PES's due to recorded NRRO and whatever correction is performed when correcting the spirals 146 for RRO. This indicates the mispositioning of each servo burst which is used to calculate the ERC values. In one example, the ERC values are stored in memory until they are written to the RRO fields 133. Typically, the ERC values for one or more revolutions of the disk 108 are stored in memory for the current track 132 until the ERC values are written to the RRO fields 133 during SSW. Depending on how the ERC values are used (i.e., added to, or subtracted from, the PES) by the servo control system 144 during normal operation of the disk drive 100, the ERC values can have a negative or positive value. In this example, the ERC values are effectively subtracted from the PES.

After SSW, during normal operation of the disk drive 100, the transducer 124 reads the servo bursts 130c in each servo sector 212 of a desired track 132. If the transducer 124 is placed at the burst seam 130d between the A, B bursts, the readback signal from the transducer 124 includes half the signal value of the A burst and half the signal value of the B burst. If the transducer 124 is shifted towards the A burst, the magnitude of the A burst increases and magnitude of the B burst decreases. The same applies to the C, D burst pair. The A, B and C, D bursts are shifted in position from each other by a fraction of the track width, such as ⅓ track width in this example. For positioning the transducer 124, the signal induced to the transducer 124 from the flux transitions in the servo bursts 130c is decoded by demodulating to form difference values (difference signals) including A–B and C–D phases. The transducer 124 position tracking information is decoded using combinations of the A–B burst phase and the C–D burst phase depending on the radial position of the transducer 124 relative to the track centerline. Further, the ERC value from the corresponding RRO field 133 is read by the transducer 124 and combined with the burst phase difference signals to obtain the PES for positioning the transducer 124. The '362 patent describes combining ERC values with burst phase values for servo control of the transducer during normal disk drive operation.

The PES indicates the distance between the center of the transducer 124 and the centerline of the desired track 132. For a requested read/write operation, the PES is used by the disk drive 100 to position the transducer 124 closer to the desired (centered) position. This centering process is repeated for each successive servo sector 212 on the track 132 until the requested read/write operation is performed in the appropriate data field 208. It should be appreciated that other schemes for storing servo information on the disk, such as A, B bursts, zones, constant linear density (CLD) recording, split data fields, and/or hybrid servo can also be used.

The present invention can be applied to SSW where temporary servo information such as the reference pattern described above is used for timing and transducer positioning to write the final servo patterns. This may include printed media, partial write systems and self-propagation servo write systems, and can be applied using multi pass writes and trims, as those skilled in the art can appreciate. Because the temporary servo information will inherently have RRO, it is necessary to remove the RRO with a real-time runout correction system to circularize the temporary servo information before using it to write the final servo pattern. The correction to cancel out the NRRO is added to whatever correction is needed to circularize the temporary servo information.

As known to those skilled in the art, in addition to the logic blocks shown in the drawings, the various methods and architectures described herein can be implemented as computer instructions for execution by a microprocessor, ASICs, firmware, logic circuits, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:

providing a reference pattern on the disk; then generating a PES using the transducer to read the reference pattern during a revolution of the disk; then self-writing a servo burst on the disk using the transducer during the revolution of the disk, wherein the PES indicates RRO for the servo burst;

calculating an ERC value for the servo burst using the PES; and storing the ERC value on the disk.

2. The method of claim 1, wherein the reference pattern is a temporary pattern.

3. The method of claim 1, wherein the reference pattern is circumferentially spaced spirals.

4. The method of claim 1, including self-writing the servo burst using the PES to position the transducer.

5. The method of claim 1, including:

generating a second PES using the transducer to read the reference pattern during a second revolution of the disk; then self-writing a second servo burst on the disk using the transducer during the second revolution of the disk, wherein the servo bursts are radially offset, circumferentially staggered servo bursts, and the second PES indicates RRO for the second servo burst; and calculating the ERC value for the servo bursts using the PES's.

6. The method of claim 5, wherein the servo bursts define a track centerline in a servo sector.

7. The method of claim 1, including:

generating a second PES using the transducer to read the reference pattern during the revolution of the disk after self-writing the servo burst, wherein the second PES indicates RRO for the servo burst;

generating an interpolated PES using the PES's; and calculating the ERC value using the interpolated PES.

8. The method of claim 1, including performing the method on a sector-by-sector basis for each servo sector in a track.

9. The method of claim 1, including calculating the ERC value without reading the servo burst.

10. The method of claim 1, including calculating the ERC value without reading a final servo pattern.

11. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:

providing a reference pattern on the disk; then generating a PES using the transducer to read the reference pattern while the transducer is at a radial position during a revolution of the disk; then self-writing the servo burst on the disk using the transducer while the transducer is at the radial position during the revolution of the disk, wherein the PES indicates RRO for the servo burst;

calculating an ERC value for the servo burst using the PES; and storing the ERC value on the disk.

12. The method of claim 11, wherein the reference pattern is a temporary pattern.

13. The method of claim 11, wherein the reference pattern is circumferentially spaced spirals.

14. The method of claim 11, including:

generating a second PES using the transducer to read the reference pattern while the transducer is at a second radial position during a second revolution of the disk; then self-writing a second servo burst on the disk using the transducer while the transducer is at the second radial position during the second revolution of the disk, wherein the servo bursts are radially offset, circumferentially staggered servo bursts, and the second PES indicates RRO for the second servo burst;

calculating the ERC value for the servo bursts using the PES's; and then storing the ERC value during a third revolution of the disk.

15. The method of claim 14, wherein the servo bursts define a track centerline in a servo sector.

16. The method of claim 14, wherein the second and third revolutions are consecutive revolutions.

17. The method of claim 11, including:

generating a second PES using the transducer to read the reference pattern while the transducer is at the radial position during the revolution of the disk after self-writing the servo burst, wherein the second PES indicates RRO for the servo burst;

generating an interpolated PES using the PES's; and calculating the ERC value using the interpolated PES.

18. The method of claim 11, including performing the method on a sector-by-sector basis for each servo sector in a track.

19. The method of claim 11, including calculating the ERC value without reading the servo burst.

20. The method of claim 11, including calculating the ERC value without reading a final servo pattern.

21. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:

providing a reference pattern on the disk; then self-writing A and B servo bursts on the disk using the transducer, wherein the servo bursts are radially offset, circumferentially staggered servo bursts that form an A, B servo burst pair;

generating a PES using the transducer to read the reference pattern after self-writing the A servo burst and before self-writing the B servo burst, wherein the PES indicates RRO for the B servo burst;

calculating an ERC value for the B servo burst using the PES; and storing the ERC value on the disk.

22. The method of claim 21, wherein the reference pattern is a temporary pattern.

23. The method of claim 21, wherein the reference pattern is circumferentially spaced spirals.

24. The method of claim 21, including self-writing the B servo burst using the PES to position the transducer.

25. The method of claim 21, including:
self-writing the A servo burst during a first revolution of the disk; then
generating the PES during a second revolution of the disk; and then
self-writing the B servo burst during the second revolution of the disk.

26. The method of claim 21, including:
self-writing C and D servo bursts on the disk using the transducer, wherein the C and D servo bursts are radially offset, circumferentially staggered servo bursts that form a C, D servo burst pair;
generating a second PES using the transducer to read the reference pattern after self-writing the C servo burst and before self-writing the D servo burst, wherein the second PES indicates RRO for the D servo burst; and
calculating the ERC value for the B and D servo bursts using the PES's.

27. The method of claim 21, including:
generating a second PES using the transducer to read the reference pattern after self-writing the B servo burst, wherein the second PES indicates RRO for the B servo burst;
generating an interpolated PES using the PES's; and
calculating the ERC value using the interpolated PES.

28. The method of claim 21, including performing the method on a sector-by-sector basis for each servo sector in a track.

29. The method of claim 21, including calculating the ERC value without reading the servo bursts.

30. The method of claim 21, including calculating the ERC value without reading a final servo pattern.

31. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a reference pattern on the disk; then
self-writing a first servo burst on the disk using the transducer while the transducer is at a first radial position; then
generating a PES using the transducer to read the reference pattern while the transducer is at a second radial position; then
self-writing a second servo burst on the disk using the transducer while the transducer is at the second radial position, wherein the servo bursts are radially offset, circumferentially staggered servo bursts that form a servo burst pair, and the PES indicates RRO for the second servo burst;
calculating an ERC value for the second servo burst using the PES; and
storing the ERC value on the disk.

32. The method of claim 31, wherein the reference pattern is a temporary pattern.

33. The method of claim 31, wherein the reference pattern is circumferentially spaced spirals.

34. The method of claim 31, wherein the servo bursts define a track centerline in a servo sector.

35. The method of claim 31, including:
self-writing the first servo burst during a first revolution of the disk; then
generating the PES during a second revolution of the disk; and then
self-writing the second servo burst during the second revolution of the disk.

36. The method of claim 31, including:
self-writing a third servo burst on the disk using the transducer while the transducer is at a third radial position; then
generating a second PES using the transducer to read the reference pattern while the transducer is at a fourth radial position; then
self-writing a fourth servo burst on the disk using the transducer while the transducer is at the fourth radial position, wherein the third and fourth servo bursts are radially offset, circumferentially staggered servo bursts that form a second servo burst pair, and the second PES indicates RRO for the fourth servo burst; and
calculating the ERC value for the second and fourth servo bursts using the PES's.

37. The method of claim 36, including:
self-writing the first servo burst during a first revolution of the disk;
generating the PES during a second revolution of the disk;
self-writing the second servo burst during the second revolution of the disk;
self-writing the third servo burst during a third revolution of the disk;
generating the second PES during a fourth revolution of the disk; and
self-writing the fourth servo burst during the fourth revolution of the disk.

38. The method of claim 31, including performing the method on a sector-by-sector basis for each servo sector in a track.

39. The method of claim 31, including calculating the ERC value without reading the servo bursts.

40. The method of claim 31, including calculating the ERC value without reading a final servo pattern.

41. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a reference pattern on the disk; then
self-writing a first servo burst on the disk using the transducer while the transducer is at a first radial position during a first revolution of the disk; then
generating a PES using the transducer to read the reference pattern while the transducer is at a second radial position during a second revolution of the disk; then
self-writing a second servo burst on the disk using the transducer while the transducer is at the second radial position during the second revolution of the disk, thereby trimming the first servo burst and creating a burst seam between the servo bursts that is radially aligned with circumferential edges of the servo bursts, wherein the PES indicates RRO for the burst seam;
calculating an ERC value for the burst seam using the PES; and
storing the ERC value on the disk.

42. The method of claim 41, wherein the reference pattern is a temporary pattern.

43. The method of claim 41, wherein the reference pattern is circumferentially spaced spirals.

44. The method of claim 41, wherein the burst seam defines a track centerline in a servo sector.

45. The method of claim 41, including:
self-writing a third servo burst on the disk using the transducer while the transducer is at a third radial position during a third revolution of the disk; then
generating a second PES using the transducer to read the reference pattern while the transducer is at a fourth radial position during a fourth revolution of the disk; then
self-writing a fourth servo burst on the disk using the transducer while the transducer is at the fourth radial position during the fourth revolution of the disk, thereby trimming the third servo burst and creating a second burst seam between the third and fourth servo bursts that is radially aligned with circumferential edges of the third and fourth servo bursts, wherein the second PES indicates RRO for the second burst seam; and
calculating the ERC value for the burst seams using the PES's.

46. The method of claim 45, wherein the first, third, second and fourth revolutions are consecutive revolutions.

47. The method of claim 41, including:
generating a second PES using the transducer to read the reference pattern while the transducer is at the second radial position during the second revolution of the disk after self-writing the second servo burst, wherein the second PES indicates RRO for the burst seam;
generating an interpolated PES using the PES's; and
calculating the ERC value using the interpolated PES.

48. The method of claim 41, including performing the method on a sector-by-sector basis for each servo sector in a track.

49. The method of claim 41, including calculating the ERC value without reading the servo bursts.

50. The method of claim 41, including calculating the ERC value without reading a final servo pattern.

51. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a temporary reference pattern on the disk, wherein the reference pattern includes first and second circumferentially spaced spirals; then
generating a PES using the transducer to read the first spiral while the transducer is at a radial position during a revolution of the disk; then
self-writing a final servo burst on the disk using the transducer while the transducer is at the radial position during the revolution of the disk, wherein the PES indicates RRO for the servo burst;
calculating an ERC value for the servo burst using the PES; and
storing the ERC value on the disk.

52. The method of claim 51, wherein the spirals extend from an inner diameter of the disk to an outer diameter of the disk.

53. The method of claim 51, including reducing RRO in the spirals before self-writing the servo burst.

54. The method of claim 51, including self-writing the servo burst using the PES to position the transducer.

55. The method of claim 51, including:
generating a second PES using the transducer to read the first spiral while the transducer is at a second radial position during a second revolution of the disk; then
self-writing a final second servo burst on the disk using the transducer while the transducer is at the second radial position during the second revolution of the disk, wherein the servo bursts are radially offset, circumferentially staggered servo bursts, and the second PES indicates RRO for the second servo burst; and
calculating the ERC value for the servo bursts using the PES's.

56. The method of claim 55, wherein the servo bursts define a track centerline in a servo sector.

57. The method of claim 51, including:
generating a second PES using the transducer to read the second spiral while the transducer is at the radial position during the revolution of the disk after self-writing the servo burst, wherein the second PES indicates RRO for the servo burst;
generating an interpolated PES using the PES's; and
calculating the ERC value using the interpolated PES.

58. The method of claim 51, including performing the method on a sector-by-sector basis for each servo sector in a track.

59. The method of claim 51, including calculating the ERC value without reading the servo burst.

60. The method of claim 51, including calculating the ERC value without reading a final servo pattern.

61. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a temporary reference pattern on the disk, wherein the reference pattern includes first and second circumferentially spaced spirals; then
self-writing a final first servo burst on the disk using the transducer while the transducer is at a first radial position; then
generating a PES using the transducer to read the first spiral while the transducer is at a second radial position; then
self-writing a final second servo burst on the disk using the transducer while the transducer is at the second radial position, wherein the servo bursts are radially offset, circumferentially staggered servo bursts that form a servo burst pair, and the PES indicates RRO for the second servo burst;
calculating an ERC value for the second servo burst using the PES; and
storing the ERC value on the disk.

62. The method of claim 61, including reducing RRO in the spirals before self-writing the first servo burst.

63. The method of claim 61, including:
self-writing the first servo burst during a first revolution of the disk; then
generating the PES during a second revolution of the disk; and then
self-writing the second servo burst during the second revolution of the disk.

64. The method of claim 61, including:
self-writing a third servo burst on the disk using the transducer while the transducer is at a third radial position; then
generating a second PES using the transducer to read the first spiral while the transducer is at a fourth radial position; then
self-writing a fourth servo burst on the disk using the transducer while the transducer is at the fourth radial position, wherein the third and fourth servo bursts are radially offset, circumferentially staggered servo bursts that form a second servo burst pair, and the second PES indicates RRO for the fourth servo burst; and
calculating the ERC value for the second and fourth servo bursts using the PES's.

65. The method of claim 64, including:
self-writing the first servo burst during a first revolution of the disk;
generating the PES during a second revolution of the disk;
self-writing the second servo burst during the second revolution of the disk;
self-writing the third servo burst during a third revolution of the disk;
generating the second PES during a fourth revolution of the disk; and
self-writing the fourth servo burst during the fourth revolution of the disk.

66. The method of claim 65, wherein the first, third, second and fourth revolutions are consecutive revolutions.

67. The method of claim 61, including:
generating a second PES using the transducer to read the second spiral while the transducer is at the second radial position after self-writing the second servo burst, wherein the second PES indicates RRO for the second servo burst;
generating an interpolated PES using the PES's; and
calculating the ERC value using the interpolated PES.

68. The method of claim 61, including performing the method on a sector-by-sector basis for each servo sector in a track.

69. The method of claim 61, including calculating the ERC value without reading the servo bursts.

70. The method of claim 61, including calculating the ERC value without reading a final servo pattern.

71. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a temporary reference pattern on the disk, wherein the reference pattern includes first and second circumferentially spaced spirals; then
generating a PES using the transducer to read the first spiral while the transducer is at a radial position during a revolution of the disk; then
self-writing a final servo burst in a servo sector in a track using the transducer while the transducer is at the radial position during the revolution of the disk, wherein the PES indicates RRO for the servo burst;
calculating an ERC value for the servo sector using the PES;
storing the ERC value in the servo sector; and then
self-writing servo information in other tracks on the disk.

72. The method of claim 71, wherein the spirals extend from an inner diameter of the disk to an outer diameter of the disk.

73. The method of claim 71, including reducing RRO in the spirals before self-writing the servo burst.

74. The method of claim 71, including self-writing the servo burst using the PES to position the transducer.

75. The method of claim 71, including:
generating a second PES using the transducer to read the first spiral while the transducer is at a second radial position during a second revolution of the disk; then
self-writing a final second servo burst in the servo sector using the transducer while the transducer is at the second radial position during the second revolution of the disk, wherein the servo bursts are radially offset, circumferentially staggered servo bursts that form a servo burst pair, and the second PES indicates RRO for the second servo burst; and
calculating the ERC value using the PES's.

76. The method of claim 75, including self-writing the second servo burst using the second PES to position the transducer.

77. The method of claim 71, including:
generating a second PES using the transducer to read the second spiral while the transducer is at the radial position during the revolution of the disk after self-writing the servo burst, wherein the second PES indicates RRO for the servo burst;
generating an interpolated PES using the PES's; and
calculating the ERC value using the interpolated PES.

78. The method of claim 71, including performing the method on a sector-by-sector basis for each servo sector in the track.

79. The method of claim 71, including calculating the ERC value without reading the servo burst.

80. The method of claim 71, including calculating the ERC value without reading a final servo pattern.

81. A method for self-servo writing in a disk drive, wherein the disk drive includes a transducer and a disk, the transducer reads data from and writes data to the disk, the disk includes tracks, the tracks include servo sectors, embedded runout correction (ERC) values compensate for repeatable runout (RRO) in the tracks, and a position error signal (PES) positions the transducer relative to the tracks, the method comprising:
providing a temporary reference pattern on the disk, wherein the reference pattern includes first and second circumferentially spaced spirals; then
self-writing a final first servo burst in a servo sector in a track using the transducer while the transducer is at a first radial position; then
generating a PES using the transducer to read the first spiral while the transducer is at a second radial position; then
self-writing a final second servo burst in the servo sector using the transducer while the transducer is at the second radial position, thereby trimming the first servo burst and creating a burst seam between the servo bursts that is radially aligned with circumferential edges of the servo bursts and located in the servo sector, wherein the PES indicates RRO for the burst seam;
calculating an ERC value for the servo sector using the PES;
storing the ERC value in the servo sector; and then
self-writing servo information in other tracks on the disk.

82. The method of claim 81, including reducing RRO in the spirals before self-writing the first servo burst.

83. The method of claim 81, including:
self-writing the first servo burst during a first revolution of the disk; then
generating the PES during a second revolution of the disk; and then
self-writing the second servo burst and creating the burst seam during the second revolution of the disk.

84. The method of claim 81, including:
self-writing a third servo burst in the servo sector using the transducer while the transducer is at a third radial position; then
generating a second PES using the transducer to read the first spiral while the transducer is at a fourth radial position; then
self-writing a fourth servo burst in the servo sector using the transducer while the transducer is at the fourth radial position, thereby trimming the third servo burst and creating a second burst seam between the third and fourth servo bursts that is radially aligned with circumferential edges of the third and fourth servo bursts and located in the servo sector, wherein the second PES indicates RRO for the second burst seam; and
calculating the ERC value using the PES's.

85. The method of claim 84, including:
self-writing the first servo burst during a first revolution of the disk;
generating the PES during a second revolution of the disk;
self-writing the second servo burst and creating the burst seam during the second revolution of the disk;
self-writing the third servo burst during a third revolution of the disk;
generating the second PES during a fourth revolution of the disk; and
self-writing the fourth servo burst and creating the second burst seam during the fourth revolution of the disk.

86. The method of claim 85, wherein the first, third, second and fourth revolutions are consecutive revolutions.

87. The method of claim 81, including:
generating a second PES using the transducer to read the second spiral while the transducer is at the second radial position after self-writing the second servo burst, wherein the second PES indicates RRO for the burst seam;
generating an interpolated PES using the PES's; and
calculating the ERC value using the interpolated PES.

88. The method of claim 81, including performing the method on a sector-by-sector basis for each servo sector in the track.

89. The method of claim 81, including calculating the ERC value without reading the servo bursts.

90. The method of claim 81, including calculating the ERC value without reading a final servo pattern.

91. A disk drive, comprising:
a disk that includes a reference pattern and tracks, wherein the reference pattern includes servo information and the tracks include servo sectors, and embedded runout correction (ERC) values compensate for repeatable runout (RRO) in the tracks;
a transducer that reads data from and writes data to the disk; and
a controller that (1) generates a position error signal (PES) using the transducer to read the reference pattern while the transducer is at a radial position, (2) self-writes a servo burst on the disk using the transducer while using the PES to position the transducer at the radial position, wherein the PES indicates RRO for the servo burst, (3) generates a second PES using the transducer to read the reference pattern while the transducer is at a second radial position, (4) self-writes a second servo burst on the disk using the transducer while using the second PES to position the transducer at the second radial position, wherein the servo bursts are radially offset, circumferentially staggered servo bursts, and the second PES indicates RRO for the second servo burst, (5) calculates an ERC value for the servo burst using the PES's, and (6) writes the ERC value to the disk using the transducer.

92. The disk drive of claim 91, wherein the reference pattern is a temporary pattern.

93. The disk drive of claim 91, wherein the reference pattern is circumferentially spaced spirals.

94. The disk drive of claim 91, wherein the controller (1) generates the PES and self-writes the servo burst during a first revolution of the disk, and (2) generates the second PES and self-writes the second servo burst during a second revolution of the disk.

95. The disk drive of claim 94, wherein the servo bursts define a track centerline in a servo sector.

96. The disk drive of claim 91, wherein the controller calculates and stores the ERC values on a sector-by-sector basis for each servo sector in a track.

97. The disk drive of claim 91, wherein the controller calculates the ERC value without reading the servo burst.

98. The disk drive of claim 91, wherein the controller calculates the ERC value without reading a final servo pattern.

99. A disk drive, comprising:
a disk that includes a reference pattern and tracks, wherein the reference pattern includes servo information and the tracks include servo sectors, and embedded runout correction (ERC) values compensate for repeatable runout (RRO) in the tracks;
a transducer that reads data from and writes data to the disk; and
a controller that (1) generates a position error signal (PES) using the transducer to read the reference pattern while the transducer is at a radial position, (2) self-writes a servo burst on the disk using the transducer while using the PES to position the transducer at the radial position, wherein the PES indicates RRO for the servo burst, (3) generates a second PES using the transducer to read the reference pattern while the transducer is at the radial position after self-writing the servo burst, wherein the second PES indicates RRO for the servo burst, (4) generates an interpolated PES using the PES's, (5) calculates an ERC value for the servo burst using the interpolated PES, and (6) writes the ERC value to the disk using the transducer.

* * * * *